A. DENKER.
METHOD OF CUTTING THE TEETH OF SPUR GEAR WHEELS.
APPLICATION FILED FEB. 24, 1913.
1,115,910.
Patented Nov. 3, 1914.
2 SHEETS—SHEET 1.
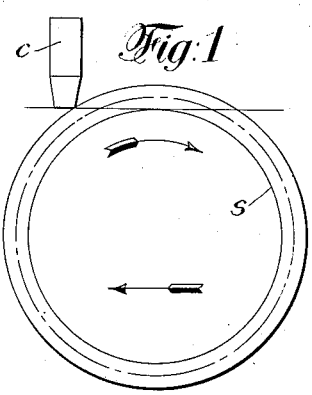
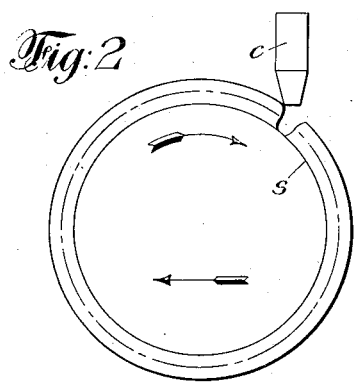
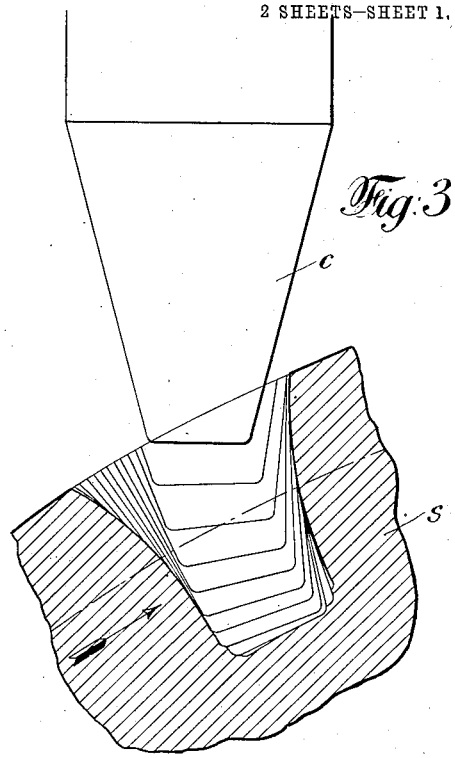
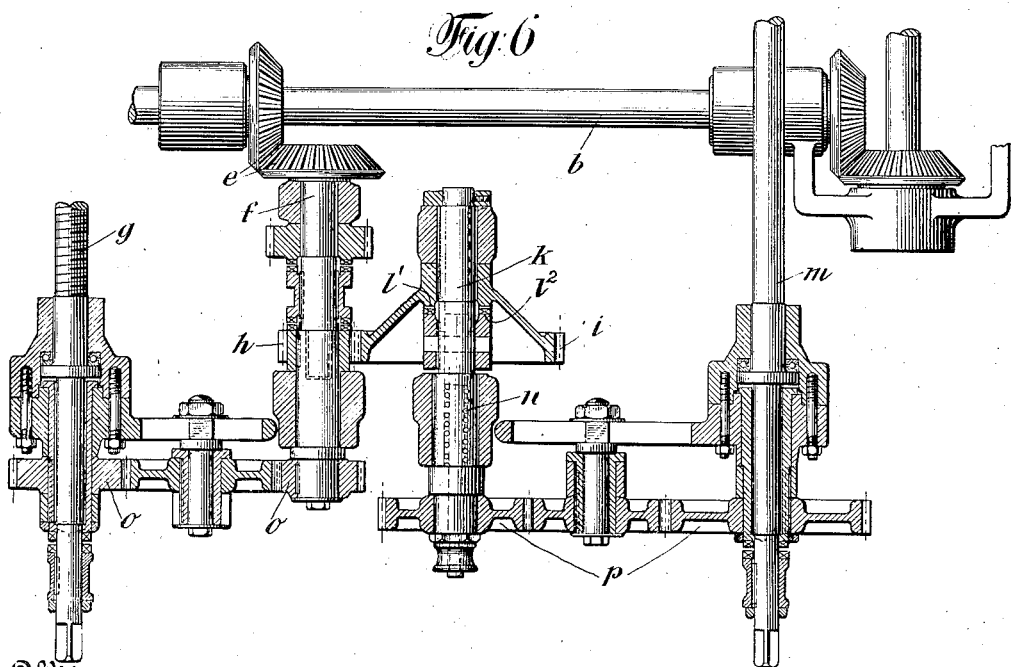
Witnesses:
John E. Rager
A. Worden Gibbs
Inventor
August Denker
By his Attorney
Aeah P. Schuck A. DENKER.
METHOD OF CUTTING THE TEETH OF SPUR GEAR WHEELS.
APPLICATION FILED FEB. 24, 1913.

1,115,910.

Patented Nov. 3, 1914.

2 SHEETS—SHEET 2.

Witnesses:
John E. Rager
A. Worden Gibbs

Inventor
August Denker
By his Attorney
Fredk. P. Schuetz.

UNITED STATES PATENT OFFICE.

AUGUST DENKER, OF TERNITZ-ON-THE-SÜDBAHN, AUSTRIA-HUNGARY, ASSIGNOR TO DIETEL-GESELLSCHAFT G. M. B. H., OF PRAGUE, AUSTRIA-HUNGARY.

METHOD OF CUTTING THE TEETH OF SPUR GEAR-WHEELS.

1,115,910. Specification of Letters Patent. Patented Nov. 3, 1914.

Continuation in part of application Serial No. 559,676, filed May 6, 1910. This application filed February 24, 1913. Serial No. 750,462.

*To all whom it may concern:*

Be it known that I, AUGUST DENKER, a subject of the German Emperor, residing at Ternitz-on-the-Südbahn, Austria-Hungary, have invented certain new and useful Improvements in Methods of Cutting the Teeth of Spur Gear-Wheels, of which the following is a specification.

This invention is a continuation in part of my co-pending application, filed May 6, 1910, Serial No. 559,676.

It relates to a method of cutting the teeth of spur gear wheels, more particularly involute teeth, by means of a reciprocating tool cutting the wheel blank which is given a rolling motion, as will hereinafter be more fully set forth.

It has for its object to effect the cutting of each complete tooth space in a continuous operation before indexing for the cutting of the next tooth space, thus reducing largely sources of error as well as effecting a considerable saving in the time of operation. The method furthermore, is not limited by the diameter of the wheel blank to be cut.

The nature of my invention will be best understood when described in connection with the accompanying drawings, in which—

Figure 4:
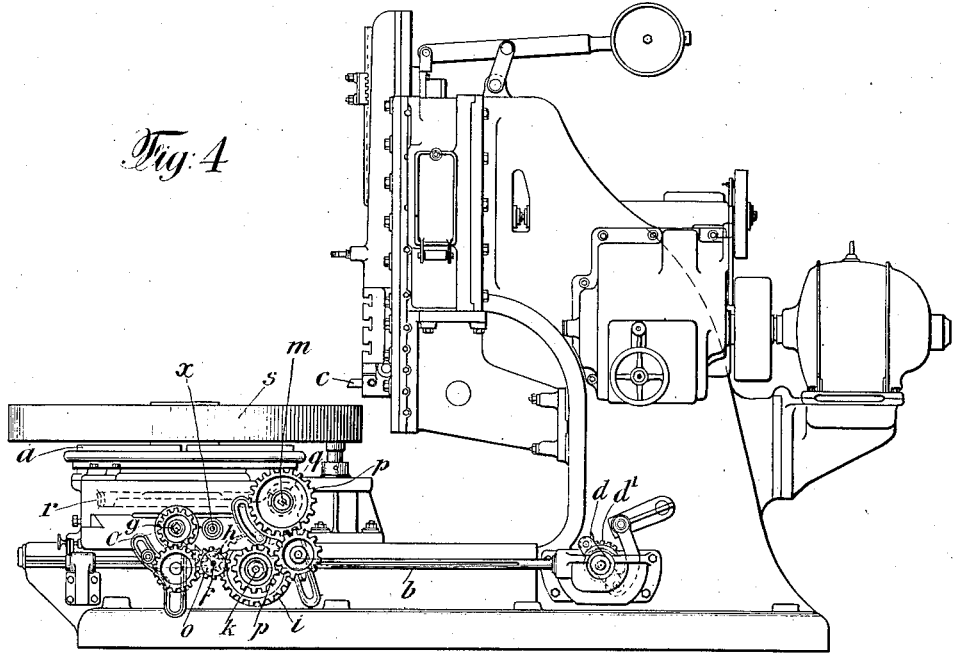
Figure 5:
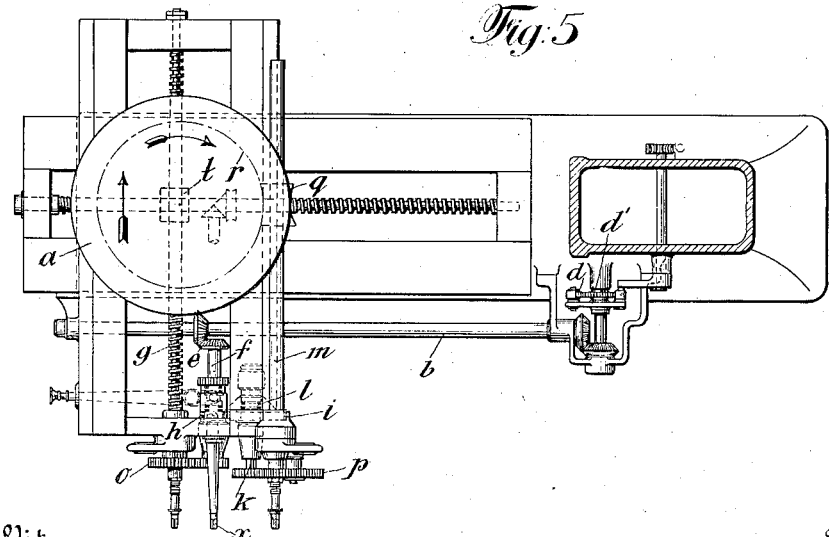

Figures 1, 2 and 3 are diagrammatic views illustrating the manner of cutting a tooth space, Fig. 1 showing the cutting tool in its initial position relatively to the wheel blank, Fig. 2, similarly the tool in its final position after having completed the cutting of a complete tooth space, and Fig. 3, various intermediate positions which the cutting tool successively assumes relatively to the wheel blank. Fig. 4 is a side elevation of a machine which may be employed in cutting the teeth in the novel manner herein claimed, only those parts of said machine being shown which are necessary for understanding the invention. Fig. 5 is a partial horizontal section of the machine with the wheel blank removed. Fig. 6 is a view (partly in section) of the transmission mechanism, extended for purposes of explanation, in one plane (not projected).

Similar characters of reference designate corresponding parts throughout the several views.

In carrying out my improved method of cutting involute teeth of spur gear wheels, by means of a reciprocating cutting tool, I employ preferably a machine having the general arrangement of a vertical slotting machine and in which the work table or support for the wheel blank to be cut is arranged according to my invention to have a cross feed as well as a rotation on its vertical axis. The forward edge of the cutting tool *c* in its initial position with respect to the wheel blank *s*, upon beginning to cut a tooth space, is made to lie in the tangent to the root circle of the teeth, Fig. 1, and the blank translated in the direction of this tangent toward said cutting tool (in the direction of the straight arrow, Fig. 1) while it is simultaneously therewith rotated away from said tool about its own vertical axis (in the direction of the curved arrow, Fig. 1). The combined motion of the wheel blank is equivalent to that produced by the rolling motion of a toothed wheel, having the same pitch circle as the teeth of spur gear to be cut, along a rack. After the tool has cut a complete tooth space, various intermediate positions of said tool relatively to said wheel blank being shown in Fig. 3, it reaches the position relatively to the said wheel blank shown in Fig. 2. The blank is then brought back in suitable manner to its initial position relatively to the cutting tool, and the cross-feed mechanism suitably disengaged from the rotating mechanism so that the latter may be independently operated to effect the indexing. After this, the cross-feed and rotary feed mechanism are again connected (automatically) and the continuous operation of cutting a tooth space is repeated.

In Figs. 4–6 inclusive I have illustrated mechanism suitable for effecting these various operations. A horizontal work table or support *a* for the wheel blank *s* is mounted on the bed of the machine and is capable of being fed along and also across the bed, and of being rotated on its own vertical axis. The table may be fed along the bed by turning shaft *x*, but this feed has no essential relation to the subject matter of the present invention, and may be of any well known construction.

*b* is a shaft mounted on one side of the machine framing, and from which the cross-feed and the rotation of the worktable are derived.

$d$ is a pawl, actuated at each stroke of the tool ram by means of a connecting rod from the driving shaft of the machine, for operating a ratchet wheel $d'$, whereby the shaft $b$ is rotated intermittently at the end of each stroke of the tool.

The rotation of the shaft $b$ is transmitted through bevel gears $e$ to a shaft $f$, and thence through intermediate gears $o$ of variable speed ratio to a cross-feed screw $g$. The worktable receives its cross-feed through a nut $t$ formed on it engaging the cross-feed screw $g$. The rotation of the shaft $f$ is also transmitted through a toothed wheel $h$ to a toothed wheel $i$ which is loose on a shaft $k$ supported in the framing of the machine.

The wheel $i$ carries one half $l'$ of a clutch, the other half $l^2$ of which is slidably keyed on the shaft $k$, which is connected through gearing $p$ having a variable speed ratio, to a worm $q$ on shaft $m$. The faces of the clutch are so constructed that its halves will be brought into engagement with each other only when they are in a certain position. This engagement is preferably effected automatically, for instance by means of a spring $n$. Rotation of the worktable is effected through the worm $q$ and worm wheel $r$ of the said worktable.

The velocity ratios of the gearing between the shaft $f$ and the cross-feed screw $g$ and of that between the clutch $n$ and the worm shaft $m$, may be varied in the usual manner by changing a pair of toothed wheels.

In order to cut involute teeth, the cross-feed and rotary feed of the worktable must have a relation to the tool such as to impart to the wheel blank to be cut, a motion equivalent to the rolling motion of a toothed wheel having the same pitch circle along a rack. For this purpose the velocity ratios of the gearing producing the cross-feed and rotary feed of the table must be such that the ratio of the speed of revolution of the cross-feed screw $g$ to the speed of revolution of the shaft $f$ will be equal to the ratio of the pitch of the wheel to be cut to the pitch of the driving worm wheel connected to the worktable. Further, the ratio of the speed of revolution of the shaft $k$ to the speed of revolution of the worm $q$ must be equal to the ratio of the number of teeth of the wheel to be cut to the number of teeth of the driving worm wheel. Also, the speed of revolution of the wheel $h$ must have a ratio to the speed of revolution of the wheel $i$ which is inverse to that of the pitch of the cross-feed screw $g$ to the pitch of the worm $q$ so as to compensate for the difference between these last two pitches. Consequently, the product obtained by multiplying the velocity ratio of the gearing between the cross-feed screw $g$ and shaft $f$ by the velocity ratio of the gearing between the shaft $k$ and worm $q$ will be the velocity ratio of the cross-feed of the table to the peripheral velocity of the worm wheel.

Now since the product of the multiplication is the ratio of the diameter of the pitch circle of the wheel to be cut to the diameter of the pitch circle of the driving worm wheel, the consequence is that the speed of the cross-feed of the wheel blank to be cut is equal to the speed of revolution at the pitch circle, that is to say, the motion of the wheel blank is the same as the rolling motion of a toothed wheel having a pitch circle of equal diameter along a rack. If, for example, the worm wheel on the work table has 140 teeth with a circle of circular pitch of $5\pi$ millimeters, that is a pitch circle diameter of 700 millimeters, and if it is desired to cut a wheel with 100 teeth and a circular pitch of $12\pi$ millimeters, that is a pitch circle diameter of 1200 millimeters, then the ratio of the speed of revolution of the cross-feed screw $g$ to the speed of revolution of the shaft $f$ must be as 12 to 5, and the ratio of the speed of revolution of the shaft $k$ to the speed of revolution of the worm $q$ must be as 100 to 140. The product of multiplication of these two ratios is $$\frac{12}{5} \times \frac{100}{140} = \frac{1200}{700}$$

and the ratio of 1200 to 700 will be the ratio of the speed of the cross-feed of the worktable to the peripheral speed of the worm wheel at the pitch circle.

Now since the ratio of the pitch circle diameter of the wheel to be cut, to the pitch circle diameter of the worm wheel, is likewise as 1200 to 700, it is clear that the ratio of the peripheral speed of the wheel to be cut to the peripheral speed of the worm wheel, will likewise be as 1200 to 700; that is to say, the peripheral speed at the pitch circle of the wheel to be cut, is equal to the amount of cross-feed of the worktable.

The operation of the improved machine is as follows:—The wheel blank $s$ to be cut having been fixed on the worktable $a$ and brought into the position shown in Fig. 1 relatively to the cutting tool such that the forward edge of said tool lies in the tangent to the root circle of the teeth to be cut, the machine is started. During the up and down movement of the cutting tool, the wheel blank receives the cross-feed and is simultaneously rotated on its own axis until it assumes the position shown in Fig. 2 relatively to the cutting tool, which is thus caused to cut a tooth space in the wheel blank, the tool being shown in various intermediate positions relatively to the blank in Fig. 3. The wheel blank is then moved back into its initial position by means of hand cranks placed on the end of the shaft m or the cross-feed screw g; after which the parts of the clutch are disconnected, and the shaft m is rotated independently of the spindle g, until after the shaft k has made a complete revolution, whereupon the clutch is automatically connected again through the action of the spring n.

Since the velocity ratio of the shaft k to the worm q corresponds to the ratio of the number of teeth of the wheel to be cut to the number of teeth of the driving worm wheel, therefore, after the shaft k has made a complete revolution, the wheel blank s will have been rotated through an angle corresponding to the pitch of the wheel to be cut, that is in the example under consideration, through an angle of 3 degrees 36 minutes, which corresponds to a circular pitch of $12\pi$.

If it is desired to cut toothed wheels having a different pitch, or a different number of teeth, it will be necessary to change merely one pair of toothed wheels of the gearing between the shaft f and the screw g, or one pair of toothed wheels of the gearing between the shaft k and the worm shaft m. When both the pitch and the number of teeth are to be different, one pair of toothed wheels will have to be changed in both gearings.

The improved machine is very much simpler to construct and manipulate than the existing shaping or slotting machines for cutting gear teeth; and the present improvements are easily applicable to every existing shaping or slotting machine.

I claim:

1. The herein described method of cutting teeth of spur gear wheels, which consists in directing the edge of the cutting tool to the wheel blank to be cut tangentially to the root circle of the teeth, and imparting simultaneously to said blank a translation toward said tool in the direction of the said tangent and a rotation about its own axis.

2. The herein described method of cutting teeth of spur gear wheels, which consists in directing the edge of the cutting tool to the wheel blank to be cut tangentially to the root circle of the teeth, and imparting simultaneously to said blank a translation toward said tool in the direction of the said tangent and a rotation about its own axis to cut a tooth space, and suitably indexing upon the cutting of a complete tooth space.

3. The herein described method of cutting teeth of spur gear wheels, which consists in directing the edge of the cutting tool to the wheel blank to be cut tangentially to the root circle of the teeth, and imparting simultaneously to said blank a translation toward said tool in the direction of the said tangent and a rotation about its own axis to cut a tooth space, returning said blank to its initial position with respect to the cutting tool, and then indexing to bring said cutting tool into position to cut the next tooth space.

4. The herein described method of cutting involute teeth of spur gear wheels, which consists in directing the edge of the cutting tool to the wheel blank to be cut tangentially to the root circle of the teeth, and imparting simultaneously to said blank a translation toward said tool in the direction of the said tangent and a rotation about its own axis such that the resultant motion of the wheel blank shall be equivalent to the rolling motion of a toothed wheel, of the same pitch circle, along a rack.

5. The herein described method of cutting teeth of spur gear wheels, which consists in directing the edge of the cutting tool to the wheel blank to be cut tangentially to the root circle of the teeth, effecting between the said tool and blank a motion of translation along the said tangent and imparting rotation to the said blank about its axis until a complete tooth space is cut, reversing said motions to return the blank and tool to their initial relative positions, and suitably indexing to bring said blank into position for the cutting of the next tooth space.

In testimony whereof, I have signed my name to this specification in the presence of two subscribing witnesses.

AUGUST DENKER.

Witnesses:
 Ada Maria Berger,
 August Fugger.